Patented Apr. 14, 1925.

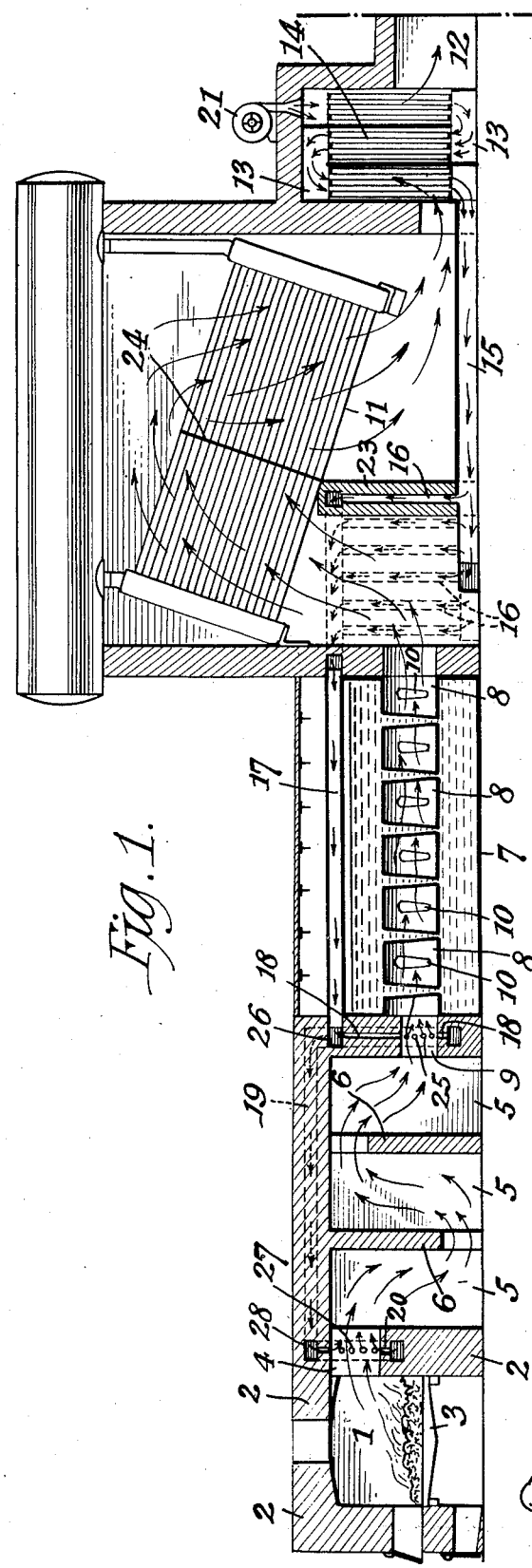

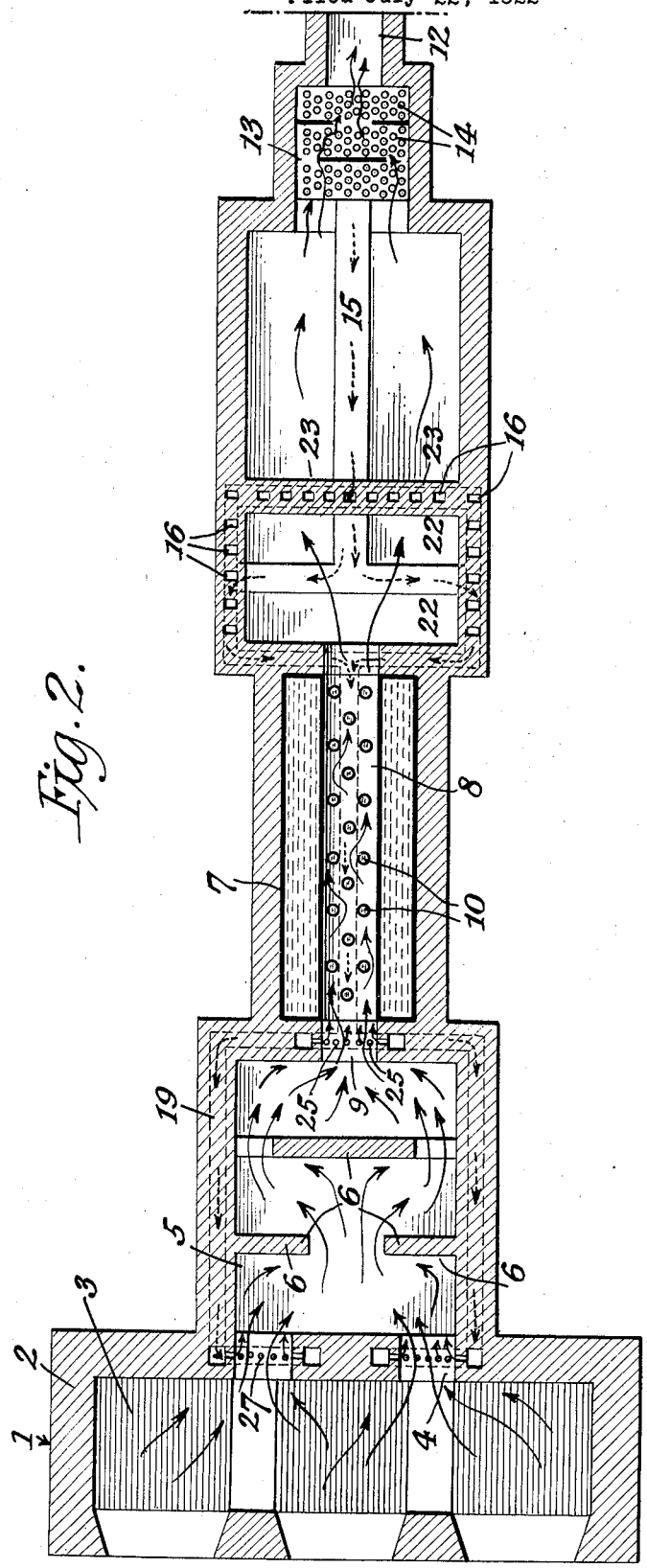

1,533,686

UNITED STATES PATENT OFFICE.

ROBERT BALMER, OF TORONTO, ONTARIO, CANADA.

METHOD OF OPERATION OF REFUSE DESTRUCTORS AND MEANS FOR PRACTICING SAME.

Application filed July 22, 1922. Serial No. 576,690.

*To all whom it may concern:*

Be it known that I, ROBERT BALMER, a subject of the King of the United Kingdom of Great Britain and Ireland, and a citizen of the Dominion of Canada, and a resident of the city of Toronto, in the Province of Ontario, in said Dominion, am the inventor or discoverer of certain new and useful Improvements in Methods of Operation of Refuse Destructors and Means for Practicing Same, of which the following is a description.

My invention relates generally to methods of operation of refuse destructors and means for practicing same, and particularly to methods of operation of refuse destructors employed in the incineration of municipal waste.

The objects of this invention are to overcome those difficulties and defects which experience has shown to be inseparable from the combustion chamber as hitherto designed in connection with current types of refuse destructors when attempting to handle municipal waste comprising wet fuels, such as garbage; street sweepings, including offal; unsorted rubbish, including tins and bottles, together with ashes and dead animals; and, further, so to overcome these disadvantages that complete combustion at high temperatures is attained of the gases, fumes and volatile products evolved from primary incineration of refuse at other than high temperatures; and so that such complete combustion may be continuously carried on at these high temperatures without those interruptions now normal to any such process; and, finally, the direct utilization of the thermal values developed from secondary combustion as radiant heat.

More specifically stated, my invention has for its object: to separate from the gases and volatile fumes formed in and issuing from the furnace proper, the so-called "dust" entrained therein; to settle and remove said dust; thereafter to burn said dust-freed gases; to supply superheated air to the gases from the furnace proper at a plurality of stages of its passage from furnace to the chimney; to promote the combustion of the separated gases by mixing with air in a secondary gas combustion stage; to contact said burning gases with a primary boiler adapted to be heated by the radiant heat of such combustion, and thereafter with a secondary boiler, adapted to utilize the heat by convection and conduction; and to control the supply of superheated air to the dust-settling and secondary combustion chambers.

Other objects of my invention will be pointed out as developed by the ensuing description of the means for practicing my novel methods of operating refuse destructors.

With the foregoing and the hereinafter stated objects in view, my invention consists fundamentally in the method of operation of refuse destructors whereby the following steps or some of them are taken:

First, the separation of the dust from the gases at temperatures below that of fusion;

Second, the deposition of the dust in a suitably designed settling chamber at subfusion temperatures, from which the removal of the precipitated dust may be effected conveniently and without interference with the progress of the fires;

Third, complete combustion of the dust-freed gases in a suitably designed high-temperature combustion chamber, preferably within the boiler structure itself;

Fourth, the utilization of radiant heat of combustion, with all the advantages in increased boiler efficiency which such conditions involve; and Fifth, the utilization of the sensible heat of the gas by convection and conduction.

In the best current types of refuse destructor, the furnace proper is devoted to primary combustion, the gases from which are then passed to an adjoining chamber of special construction, where, by the introduction and mixture of superheated air, the secondary or complete combustion is effected, and where, by means of suitable baffles and other devices, the dust swept over from the furnace is separated and deposited.

In order that this secondary combustion shall be complete and efficient, very high temperatures are attained, namely, 2,550 degrees Fahrenheit and upward, with the result that the dust referred to is vitrified and forms at the bottom and on the walls of the combustion chamber, hard masses of fused silicates, earths and metals. The removal of this material is only possible after the furnace operation has been stopped and the combustion chamber cooled down. In addition to the loss of time thus incurred, the removal of the vitreous mass adhering to the brickwork affects, necessarily, the integrity and stability of the latter. A further defect of the above arrangement is that any boiler for utilizing the heat developed in the combustion chamber must be located outside of the latter, owing to the facility with which the floating semi-fused dust adheres to the boiler surfaces, thus causing inefficiency and waste.

In the construction of my dust-settling chamber, I utilize appropriate devices for catching the dust floating in the gases and drawing it downwards to traps, from which its extraction at any moment presents no difficulty. The mechanical or physical devices referred to may be supplemented or substituted by the Cottrell or other process of electrostatic precipitation, an operation which would not be practicable at the high temperature of dust fusion. The advisability of removing the dust proceeds from the necessity of preventing the contact of the dust with the boiler-heating surfaces under the conditions of high temperatures there prevailing, and also of preventing the escape of the dust up the chimney into the atmosphere. For the purposes of preliminarily warming up this settling chamber, and thereafter, when it may in emergencies be desirable to occasionally create, momentarily (or partially, for periods), secondary combustion in the settling chamber, I provide for the admission of superheated air through valves or dampers under convenient control of the operator. The purpose of this emergency provision is to burn out any particles of carbon or other unconsumed organic matter that may have been carried over by the furnace gases under unusual conditions of fuel, draft or the like.

In the construction of the secondary combustion chamber, I utilize superheated air so distributed as to insure the quickest and completest mixture with the gases from the furnace. As stated above, the combustion chamber is preferably a flue located within and forming a part of the boiler structure, and is so arranged that the surfaces to be heated shall absorb the maximum proportion of radiant heat issuing from the gases in active combustion.

The operation of my invention will be understood from the accompanying drawings, partially diagrammatic, in which Figure 1 is a vertical longitudinal sectional view of the essential features of a complete refuse destructor unit, and Figure 2 is a horizontal sectional view thereof, both showing the connection to, but omitting, the chimney. These drawings exhibit the principal components of an installation embodying the principles of utilization of radiant heat, and appropriate arrangements and disposition therefor.

Referring to the drawings in detail and to the numerals employed to designate the like parts throughout, 1 is the furnace proper; 2 the walls and arch thereof; 3 the firegrates; 4 the smoke-flues issuing from the furnace proper and leading into the settling chamber 5. This chamber is divided by diaphragms 6, 6, having vertically offset openings to circulate the gases, as indicated by the arrows, and preferably constructed of firebrick. 7 is a horizontal cylindrical boiler. Through this boiler extends the fire flue or secondary combustion chamber 8. The hot gases from chamber 5 pass by way of flue 9 and through chamber 8, as indicated, impinging on the water-circulating flare-topped, vertically disposed cross-tubes 10 in their course toward the secondary boiler 11. 12 is the smoke flue leading from the latter toward the chimney, not shown in drawing. 13 is an air-supply, heating and circulating apparatus situated between the boiler 11 and the smoke flue 12. In this hot air apparatus are shown vertical tubes 14 separated by offset vertical baffles, through which tubes air is blown by the fan 21, and about which tubes the spent gases circulate en route to 12. The air thus blown into the tubes 14 finds outlet from the air heater into the flue 15 extending underneath the floor of the chamber containing the auxiliary boiler 11. From this flue 15 smaller flues 16 issue through the brick walls enclosing that half of the chamber 22 formed by the dividing wall 23 which serves partially to support the auxiliary boiler, and from which extends the baffle 24, compelling the circulation of gas currents thereabout and therethrough, as indicated by the arrows. The flues 16 communicate with a passage 17 above the cylindrical boiler 7 and with passages 18 surrounding the outlet flue 9, and discharging through suitable perforations 25 therein. An extension 19 of the passage 17 is shown as passing above the settling chamber and terminating through suitable pipes 20 and perforations 27 in the outlet flue 4, controlled by valves 28.

A brief description of the operation of the installation represented by the accompanying drawings will help to make clear the character and importance of my invention. The refuse or other similar fuel, after being deposited on the firegrate 3, is ignited and the gases produced by the combustion leave the furnace chamber 1 through the outlet flues 4 entering the settling chamber 5.

I limit the normal utilization of superheated air through passages 19 and 20 into the flue 4, except for an occasional brief interval, as above described, solely to the purpose of warming up the chamber 5 sufficiently to prevent a fall of temperature in the gases from furnace 1 through said settling chamber 5. When this warming up has been sufficiently performed, the ingress of superheated air through passages 20 is stopped by closing the dampers or regulating valves 28, and superheated air is admitted by opening the valves 26 through passages 18 and perforations 25 surrounding and venting into flue 9 at the point of exit of the gases from the settling chamber 5 into the fire flue 8 which traverses the boiler 7. This disposition defers the operation of secondary combustion from chamber 5 to the fire flue or secondary chamber, and limits the functions of the chamber 5 to those of a settling chamber for the dust or other unconsumed particles of fuel which may have been carried by the draft from the furnace into said chamber 5. The secondary combustion, initiated at flue 9 outside of the settling chamber by the supply of oxygen, takes place in the flue 8, producing a flame with its accompanying radiant heat, free of dust and mineral particles in fusion. The absorption of this radiant heat for heating or power purposes as speedily as possible is a desideratum in steam-generating plants. For this reason I surround the gases issuing through flue 9 as completely as possible, with the heat-absorbing surfaces of a boiler, as illustrated in the accompanying drawing, the boiler in this case being of Cornish or Lancastershire type, with cross circulating tubes 10 bisecting chamber or flue 8. But I do not wish to be understood as intending to limit the method of radiant heat absorption to this particular type or disposition of boiler.

The further utilization of the heat contained in the gases follows the course usually adopted in modern steam generating plants. The drawings show arrangements for recuperating heat from the gases as they leave the boiler 11 by means of an air heater 13 installed between boiler 11 and the smoke flue 12 communicating with the chimney, and means by which a fan 21 propels air through said air heater 13, thereby raising the temperature of said air by heat absorbed from the waste gases of the boiler. Passages 15, 16 and 18 are so located as to aid the heating of the air to yet higher temperatures, reaching a maximum at the point of discharge into flue 9. The same principle is also observed in the heating of the air in passages 19 and 20 prior to its discharge into exit flue 4.

By the described processes and the means shown, I overcome the defects and disadvantages attendant upon refuse destructor combustion as heretofore practiced, and realize the benefits and advantages set forth as the objects to be attained.

It is to be understood that the particular structural embodiment disclosed is not to be accepted as a limitation upon either my processes or means.

In certain of the appended claims I have used the term "dust" as particularly descriptive of the inorganic matter suspended in the gaseous products of combustion. It will be understood that such products, as they issue from the furnace of primary combustion to the settling chamber, may include combustible material. If such products do contain such materials, as particles of carbon or other organic matter, they may be flashed or burnt out by an intermittent influx of superheated air, or precipitated with the inorganic matter constituting the dust proper and returned therewith to the furnace. The phrase "dust-free gases" is used throughout the specification as a concise description of the gaseous products of primary combustion from which the dust-particles have been removed by settling. In any case, the temperature of the settling chamber is to be maintained well above the point of ignition of the gases and materially below that of fusion of the inorganic matter. The fusion of inorganic dust approximates 2550° Fahrenheit.

Having thus described my invention, I claim:

1. The method of operation of refuse destructors consisting in burning the refuse in a primary combustion chamber, leading the gaseous products of combustion therefrom to a second chamber, and there separating the inorganic matter suspended in said products from the gases thereof while maintaining the temperature in said chamber approximately at the combustion point of said gases and slightly below the fusion point of said matter.

2. The method of operation of refuse destructors consisting in burning the refuse in a primary combustion chamber, leading the gaseous products of combustion therefrom to a second chamber, there precipitating the inorganic dust from said products at a temperature adapted to maintain the gases hot and to cause combustion of organic matter, but not to cause fusion of the inorganic matter suspended therein; and then raising the temperature of the gases to a point above that of dust-fusion.

3. The method of operation of refuse destructors consisting in burning the refuse in a primary combustion chamber, leading the gaseous products of combustion therefrom to a second chamber, supplying superheated air to said second chamber for an interval sufficient to cause combustion of the organic matter contained in said products but for an interval and at a temperature insufficient to fuse any inorganic matter therein, and then precipitating the inorganic dust in said chamber.

4. The method of operation of refuse destructors consisting in burning the refuse in a primary combustion chamber, leading the gaseous products of combustion therefrom to a second chamber, there separating the inorganic matter suspended in said products from the gases thereof while maintaining the temperature in said chamber approximately at the combustion point of said gases and slightly below the fusion point of said matter, and leading the gases to a third chamber and there burning same.

5. The method of operation of refuse destructors consisting in burning the refuse in a primary combustion chamber, leading the gaseous products of combustion therefrom to a second chamber, there separating the inorganic matter suspended in said products from the gases thereof while maintaining the temperature in said chamber approximately at the combustion point of said gases and slightly below the fusion point of said matter, leading the gases to a third chamber, mixing same with preheated air, and there burning same.

6. The method of operation of refuse destructors consisting in burning the refuse in a primary combustion chamber, leading the gaseous products of combustion therefrom to a second chamber, there separating the inorganic matter suspended in said products from the gases thereof while maintaining the temperature in said chamber approximately at the combustion point of said gases and slightly below the fusion point of said matter, leading the gases to a third chamber and there burning same, and utilizing the radiant heat therefrom.

7. The method of operation of refuse destructors consisting in burning the refuse in a primary combustion chamber, freeing the resultant gaseous products of combustion from dust, and separately burning the dust-freed gases, such separate combustion being aided by a substantially dust-free medium.

8. The method of operation of refuse destructors consisting in burning the refuse in a primary combustion chamber, freeing the resultant gaseous products from dust, and separately burning the dust-freed gases within a boiler.

9. The method of operation of refuse destructors consisting in burning the refuse in a primary combustion chamber, freeing the resultant gaseous products from dust, mixing said dust-freed gases with air, and separately burning such mixture in a secondary combustion chamber.

10. The method of operation of refuse destructors consisting in burning the refuse in a primary combustion chamber, freeing the resultant gaseous products from dust, mixing the dust-freed gases with a combustion-promoting fluid, and burning same while in contact with heat-absorbing surfaces.

11. The method of operation of refuse destructors consisting in burning the refuse in a primary combustion chamber, freeing the resultant gaseous products of combustion from dust, separately burning the dust-freed gases, and utilizing successively the thermal values of said burning gases, first as radiant heat, second by convection, and third by conduction.

12. The method of operation of refuse destructors consisting in the separation of the dust carried by the gases created by primary combustion, the delivery of the gases thus freed from dust into a chamber, and the burning of the gases therein, the combustion promoting means being substantially dustless.

13. The method of operation of refuse destructors consisting in the separation of the dust carried by the gases created by primary combustion, the delivery of the gases thus freed from dust into a chamber, the injection of superheated air therein and the destruction of said gasses by secondary combustion.

14. The method of operation of refuse destructors consisting in the prior separation, in a suitable settling chamber, of the dust carried by the gases from the furnace proper, the delivery of the gases thus freed from dust into a flue, the injection thereinto of superheated air, and there effecting a secondary or complete combustion of the dust-free gases.

15. In a refuse destructor, a primary combustion chamber, a dust-settling chamber in direct communication therewith, and with a secondary combustion chamber, and a source of supply of superheated air intermediate said settling chamber and said secondary combustion chamber.

16. In a refuse destructor, a primary combustion chamber, a dust-settling chamber in communication therewith, a source of supply of superheated air intermediate said primary combustion chamber and said settling chamber, and a secondary combustion chamber in communication with said settling chamber.

17. In a refuse destructor, a primary combustion chamber, a dust-settling chamber in communication therewith, a source of supply of superheated air intermediate said primary combustion chamber and said settling chamber, a secondary combustion chamber in communication with said settling chamber, and a source of supply of superheated air intermediate said settling chamber and said secondary combustion chamber.

18. In a refuse destructor, a primary combustion chamber, a dust-settling chamber in communication therewith, a source of supply of superheated air intermediate said primary combustion chamber and said settling chamber, a secondary combustion chamber in communication with said settling chamber, a source of supply of superheated air intermediate said settling chamber and said secondary combustion chamber, and means adapted to regulate the volume of air supplied.

19. In a refuse destructor, a primary combustion chamber, a dust-settling chamber communicating therewith, and a secondary combustion chamber communicating with said dust-settling chamber, the said secondary combustion chamber constituting part of a steam generator adapted to absorb the radiant heat emitted by the combustion of the dust-free gases issuing from the settling chamber.

20. In a refuse destructor, serially communicating chambers as follows: a furnace, a dust-settling chamber, a gas combustion chamber, a boiler chamber and an air preheating chamber, and pipes leading from the last through a part of the boiler chamber to the entrance of the gas combustion chamber.

21. In a refuse destructor, serially communicating chambers as follows: a furnace, a dust-settling chamber, a gas combustion chamber, a boiler chamber and an air preheating chamber, pipes leading from the last through a part of the boiler chamber to the entrance of the gas combustion chamber, and an extension of said pipes led through a part of the settling chamber to the entrance thereof.

22. In a refuse destructor, serially communicating chambers as follows: a furnace, a dust-settling chamber, a gas combustion chamber, a boiler chamber and an air pre heating chamber, pipes leading from the last through a part of the boiler chamber to the entrance of the gas combustion chamber, an extension of said pipes led through a part of the settling chamber to the entrance thereof, and dampers adapted to close the said extension.

23. In a refuse destructor, serially communicating chambers as follows: a furnace, a dust-settling chamber, a gas combustion chamber, a boiler chamber and an air preheating chamber, pipes leading from the last through a part of the boiler chamber to the entrance of the gas combustion chamber, and a boiler in said boiler chamber adapted to be heated by the products of combustion issuing from said gas combustion chamber.

24. In a refuse destructor, serially communicating chambers as follows: a furnace, a dust-settling chamber, a gas combustion chamber, a boiler chamber and an air preheating chamber, pipes leading from the last through a part of the boiler chamber to the entrance of the gas combustion chamber, a boiler in said boiler chamber adapted to be heated by the products of combustion issuing from said gas combustion chamber, and a steam superheater adapted to be heated by the combustion of gas in said combustion chamber.

25. In a refuse destructor, serially communicating chambers as follows: a furnace, a dust-settling chamber, a gas combustion chamber, a boiler chamber and an air preheating chamber, pipes leading from the last through a part of the boiler chamber to the entrance of the gas combustion chamber, and means adapted to preheat said air in said air chamber with the products of combustion issuing from the boiler chamber.

26. In a refuse destructor plant, a series of chambers constituting a furnace unit and comprising, first, a primary combustion chamber adapted to incinerate waste at temperatures adequate to volatilize organic substances, hydrocarbons and carbohydrates therein; second, a dust-settling chamber adapted to receive such volatilized substances; means therein adapted to remove the suspended dust without fusing such dust or substantially lowering the temperature of the volatile gases; and third, a secondary combustion chamber and means adapted to supply superheated air thereto, to mix such air with said volatile gases, to ignite same, and to effect complete combustion of such volatile gases at high temperatures.

27. In the operation of refuse destructors, the step consisting in inorganic dust-separation at temperatures below that of fusion of inorganic dust and above that of combustion of organic dust.

28. In the operation of refuse destructors, the step consisting in dust-separation at temperatures below inorganic dust fusion-point and approximating 2550° F.

29. In the operation of refuse destructors, the method of destruction of gases resultant from primary combustion consisting in mixing superheated air under pressure with refuse-combustion gases free from inorganic dust, and burning such mixture at a temperature approximating that of inorganic dust's fusion point.

30. In the operation of refuse destructors, the step in the destruction of refuse-combustion gases consisting in burning dust-free refuse-combustion gases at temperatures above that of the fusion point of inorganic dust.

31. In the operation of refuse destructors, the steps comprised in maintaining the temperature of the gaseous products of primary incineration above the point of combustion of combustible matter suspended in said gases and below the point of fusion of non-combustible matter suspended therein until such combustible matter has been burnt; then separating and depositing the non-combustible matter from said gases; then raising the temperature of the gases so separated above the said fusion point and separately burning same; and removing the deposited unfused dust.

ROBERT BALMER.